United States Patent [19]

Ross

[11] Patent Number: 5,071,244
[45] Date of Patent: Dec. 10, 1991

[54] SOFT BIFOCAL CONTACT LENS

[76] Inventor: Richard M. Ross, P.O. Box 1182, Windermere, Fla. 34786

[21] Appl. No.: 592,336

[22] Filed: Oct. 3, 1990

[51] Int. Cl.$^5$ ................................................ G02C 7/04
[52] U.S. Cl. ................................ 351/161; 351/160 H
[58] Field of Search ............... 351/160 R, 160 H, 161, 351/162

[56] References Cited

U.S. PATENT DOCUMENTS 3,973,837  8/1976  Page .................................. 351/161 X

FOREIGN PATENT DOCUMENTS 910455  11/1962  United Kingdom ................ 351/161
1048001  11/1966  United Kingdom ................ 351/161

OTHER PUBLICATIONS

Brager, J. L.; "Contact Lenses for the Presbyope"; The Optometric Weekly; vol. 55; No. 22; May 28, 1964; pp. 22-24.
Taylor, C. M.; "The McKay Taylor Additive Bifocal"; The Optician; vol. 143, No. 3715; Jun. 15, 1962; pp. 585-587.

Primary Examiner—Scott J. Sugarman
Attorney, Agent, or Firm—Macdonald Wiggins

[57] ABSTRACT

A soft bifocal contact lens has a carrier lens of soft plastic material shaped and dimensioned to an eye of a user. A central portion of the carrier lens is formed to provide distance-vision correction for the eye of the user. An auxiliary lens smaller than the carrier lens is attached adjacent a lower edge of the carrier lens, and formed to provide near-vision correction for the eye of the user. The auxiliary lens has a contour of a lower edge thereof for contacting a lower eyelid of the user to translate the carrier lens upward when the user moves the eye downward for close vision.

9 Claims, 1 Drawing Sheet

FIG. 1
FIG. 2
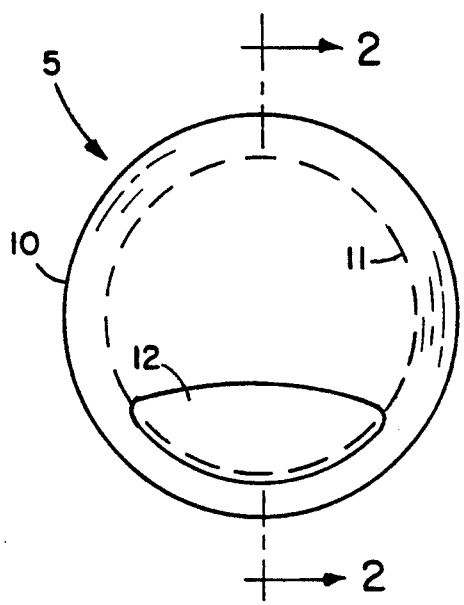
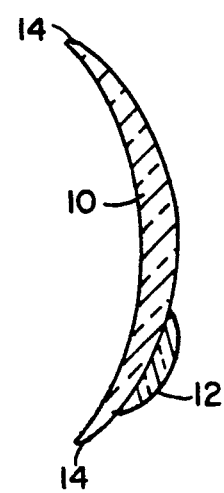
FIG. 3
FIG. 4
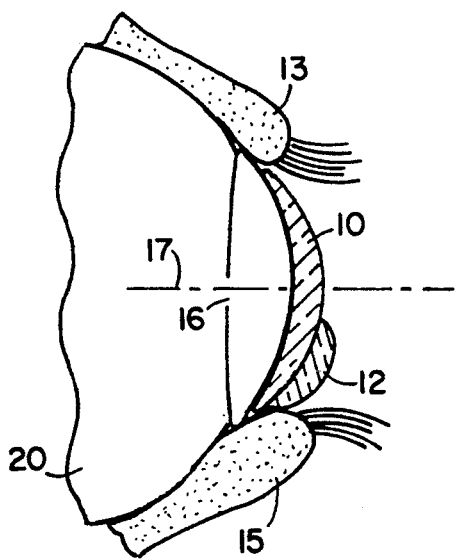
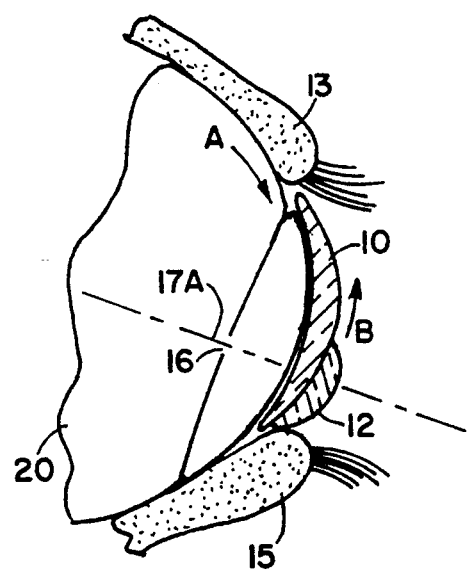
FIG. 5
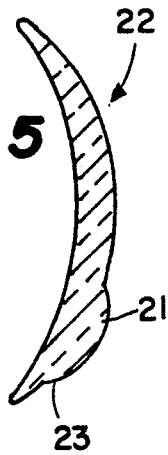

SOFT BIFOCAL CONTACT LENS

BACKGROUND OF THE INVENTION

1. Field of the Invention

The present invention relates to contact lenses, and more particularly to a bifocal lens of having a soft plastic material in contact with the eye.

2. Description of the Prior Art

Persons suffering from presbyopia require bifocal type lenses to enable them to focus on both distant and near objects. Such lenses require areas having two different powers and correction. Bifocal lenses are known for both conventional glasses, and for contact lenses that are inserted directly to the eye. The most common bifocal contact lens is of the alternating vision type in which the distance power portion is ground to permit the target to be viewed when looking straight ahead. For closeup viewing, the lens must move over the surface of the eye to place the closeup power portion directly over the pupil, with the distance power portion then out of the line of sight.

It is therefore common to form the lens from a rigid plastic material, such that the lower edge of the lens contacts the lower eyelid when the eye is rotated downward, causing the lens to move upward. Gravity and the upper eyelid returns the lens to the distance position when the eye is rotated to the straight ahead position. It has been found that many persons have difficulty with a lack of comfort of hard plastic lenses, and prefer those of soft materials. Heretofor, soft plastic bifocal lenses have not been successful. The problem is that the edges of a lens tend to move under the eyelid, rather than being moved.

Typical prior art patents of bifocal contact lenses include U.S. Pat. Nos. 4,874,234; 4,618,229; 3,597,055; 3,560,598, and 3,440,306, and Japan patent No. 63-95,415.

There is a need for soft bifocal lens that will be moved when a user's eyes shift from a far vision position to a close vision position, and that will be comfortable for the user.

SUMMARY OF THE INVENTION

The present invention utilizes as a carrier a soft hydrophilic contact lens having its central portion formed to the distance correction prescription of the user. The lower margin of the carrier may be tapered. A small, auxiliary lens is formed to the close up prescription of the user, and is cemented along a lower margin of the carrier. As will be recognized, the auxiliary lens will protrude slightly from the surface of the carrier. The carrier is formed to fit over the eye of the user with the central portion centered over the pupil. Thus, the closeup lens will normally be below the line of sight of the wearer.

When the wearer looks downward for reading or the like, the tapered margin of the carrier may tend to move beneath the lower eyelid. When the eyelid contacts the protruding auxiliary lens, the carrier is translated vertically, placing the auxiliary lens over the pupil, and the line of sight of the user than passes through the closeup lens portion.

When the user returns the eye to a distance line of sight, the lens will translate downward by gravity, and an action of the upper lid, to move the distance prescription portion back over the pupil.

As will be recognized, the invention provides a soft lens carrier that can be worn by most persons without discomfort.

It is therefore a principal object of the invention to provide a bifocal contact lens of soft plastic having a distance prescription formed in the central portion, and a close up prescription along a lower portion, such that the lens will be translated upward by the lower eyelid when close up vision is required.

It is another object of the invention to provide a bifocal contact lens using a carrier of soft lens material with a central portion formed to provide distance viewing correction, and an auxiliary lens portion formed to provide close up correction attached along a lower margin of the carrier in which the auxiliary lens projects slightly to permit contact with a lower eyelid for translating the carrier over the pupil when the eye is moved downward.

These and other objects and advantages will become apparent from the following detailed description when read in conjunction with the drawings.

BRIEF DESCRIPTION OF THE DRAWINGS

FIG. 1 is a front view of a typical soft plastic contact lens in accordance with the invention;

FIG. 2 is a cross section through the plane 2—2 of the lens of FIG. 1;

FIG. 3 is a sectional view of an eye fitted with a lens of the invention positioned for distance viewing;

FIG. 4 is a sectional view of an eye positioned for closeup viewing; and

FIG. 5 is a cross sectional view of an alternative embodiment of the invention.

DETAILED DESCRIPTION OF THE PREFERRED EMBODIMENT

The bifocal soft lens of the invention may be made in various sizes to custom fit a particular patient. For purposes of disclosure, a typical design of the bifocal soft lens 5 is shown in FIG. 1. A carrier lens portion 10 is formed of a soft plastic such as is known in the art for use with single vision lens. The lens 10 is ground, molded, or otherwise formed, in area 11 to correct the vision defect of the patient, such as astigmatism and nearsightedness. For example, area 11 may provide correction for distance vision. Hydrogel lenses are commonly available molded to provide for a wide range of vision defects. Such lenses generally utilize a plastic selected from four groups: low water nonionic polymers; high water nonionic polymers; low water ionic polymers; and high water ionic polymers. Any of the available lenses hydrogel lenses may be used as carrier lens 10 of the invention.

To provide correction for close-up vision deficiency, an auxiliary lens 12 is provided. Lens 12 may be formed with various shapes, although a flattened ellipse is shown for exemplary purposes. Other shapes may be circular, semicircular, essentially rectangular, and triangular. Any suitable lens material may be used for auxiliary lens 12, such as soft (hydrophilic), silicone-acrylates, and fluoropolymer plastics. Auxiliary lens 12 is attached to carrier lens 10 by any suitable means such as silicone sealant, thermal or chemical means. As will be noted from FIG. 2, auxiliary lens 12 projects slightly from the surface of carrier lens 10, and edges 14 are tapered for comfort.

Referring to FIG. 3, an eye 20 is shown in cross section with lens carrier 10 in place for normal distance viewing along a line 17 through iris 16. Thus, the focusing provided by area 11 will provide correction for such viewing. When the user rotates the eye downward, as shown by arrow A, the lens carrier 10 moves downward with eye, and contacts lower eyelid 15. Due to the nature of soft lens plastic, eyelid 15 tends to ride over the tapered lower edge of carrier lens 10. When the protruding auxiliary lens 12 contacts eyelid 15, continued movement of the eye 20 downward cause carrier lens 10 to be translated upward as indicated by arrow B. This action advantageously places auxiliary lens 12 in the field-of-view of line 17A, thus providing close-up viewing correction.

When eye 20 returns to the position shown in FIG. 3, carrier lens is initially carried upward. However, the weight of the lens 5 causes carrier lens 10 to return to the normal position of FIG. 3.

In an alternative configuration 22 of the invention, shown in vertical cross section in FIG. 5, the entire lens 22 may be molded, or otherwise formed, in one piece with the auxiliary lens 21 having a blunt lower edge 23 that is contacted by the lower eyelid to translate lens 22 upward as discussed hereinabove.

When fitting the lens of the invention, the distance from the lower eyelid to the lower edge of the pupil is measured. The height of the correction region 11 of lens 5 or 22 is then selected to fit the measured distance.

As will be recognized, the bifocal lens of the invention provides a bifocal contact lens that combines the comfort of a soft lens with the superior translation characteristics of hard plastic contact lens materials. The discomfort caused by contact of an eyelid with known hard lens materials is thus avoided.

Although specific examples of the invention have been shown for purposes of disclosure, it is to be understood that various modifications can be made therefrom without departing from the spirit and scope of the invention.

I claim:

1. A soft bifocal contact lens comprising:
   a generally concavo-convex carrier lens of soft plastic material shaped and dimensioned to an eye of a user;
   a central portion of said carrier lens formed to provide distance-vision correction for the eye of the user; and
   an auxiliary lens smaller than said carrier lens attached adjacent a lower edge of said carrier lens, and formed to provide near-vision correction for the eye of the user, said auxiliary lens having a contour of a lower edge thereof for contacting a lower eyelid of the user for translating said carrier lens upward when the user moves the eye downward.

2. The lens as defined in claim 1 in which said auxiliary lens is formed from a hard plastic.

3. The lens as defined in claim 2 in which said hard plastic is a silicone-acrylic.

4. The lens as defined in claim 2 in which said hard plastic is a fluoropolymer material.

5. The lens as defined in claim 1 in which said auxiliary lens is attached to said carrier lens by cementing.

6. The lens as defined in claim 1 in which said soft plastic is a hydrogel material.

7. The lens as defined in claim 6 in which said material is selected from the group consisting of low water nonionic polymers, high water nonionic polymers, low water ionic polymers, and high water ionic polymers.

8. A soft bifocal contact lens comprising:
   a generally concavo-convex carrier lens of soft plastic material shaped and dimensioned to an eye of a user;
   a central portion of said carrier lens formed to provide distance-vision correction for the eye of the user; and
   an auxiliary lens formed in said carrier lens adjacent a lower edge thereof, and shaped to provide near-vision correction for the eye of the user, said auxiliary lens having a contour of a lower edge thereof for contacting a lower eyelid of the user for translating said carrier lens upward when the user moves the eye downward.

9. The lens as defined in claim 6 in which said carrier lens and said auxiliary lens are formed from a material selected from the group consisting of low water nonionic polymers, high water nonionic polymers, low water ionic polymers, and high water ionic polymers.

* * * * *